July 26, 1955  D. J. SCHRUM  2,714,034
AIR-NOISE ELIMINATING AUTOMOBILE VENT WING WINDOW
Filed Aug. 31, 1951  3 Sheets-Sheet 1

INVENTOR.
Donald J. Schrum
BY
Brown, Jackson, Boettcher & Dienner.
ATTORNEYS.

INVENTOR.
Donald J. Schrum

July 26, 1955 D. J. SCHRUM 2,714,034
AIR-NOISE ELIMINATING AUTOMOBILE VENT WING WINDOW
Filed Aug. 31, 1951 3 Sheets-Sheet 3

INVENTOR.
Donald J. Schrum
BY Brown, Jackson, Boettcher & Diemer
ATTORNEYS.

United States Patent Office 2,714,034
Patented July 26, 1955

2,714,034

AIR-NOISE ELIMINATING AUTOMOBILE VENT WING WINDOW

Donald J. Schrum, South Bend, Ind., assignor, by mesne assignments, to Studebaker-Packard Corporation, a corporation of Michigan Application August 31, 1951, Serial No. 244,532

13 Claims. (Cl. 296—44)

The present invention relates to vent wing windows for vehicles.

Vehicle vent wing windows are well known and have been utilized for several years for providing no-draft ventilation for the passenger compartment of vehicles. The vent wings are pivotally mounted in the vehicle window frames for movement about a generally vertical axis so that the portion of the window forwardly of the pivotal axis may be moved into the interior of the vehicle and the portion of the window rearwardly of the pivotal axis may be moved to the exterior of the vehicle. The vent wings may be moved to any one of a plurality of positions in which the wings are particularly adapted for providing no-draft ventilation of the vehicle passenger compartment and to further positions in which wind draft is directed to the interior of the vehicle. While direct draft ventilation has some desirability, the occurrence of such should be limited to the extreme open positions of the wings.

No-draft ventilation is provided by the vent wings in positions of partial opening wherein air within the vehicle is exhausted through the window opening to the rear of the pivotal axis and fresh air is drawn in through the window opening forwardly of the pivotal axis. Draft ventilation is provided by conventional vent wings when the wings are opened sufficiently to move the rearward portion of the window into the air stream around the vehicle to such extent and at such an angle as to force air in through the window opening forwardly of the window pivot axis.

While providing certain advantages, conventional vent wings suffer the disadvantage that when the vehicle is set in motion substantial air noise accompanies use of the vent wings. I have made certain investigations to determine the cause of the air noises and have found that they are the result of the disposition of the wings with respect to the fast moving air stream on the side of the vehicle. The noise created by conventional wings is due to two factors, actual impingement of air on the portions of the vent wing extending into the air stream and the turbulence of the air exhausted from the vehicle entering the fast moving air stream. Both noise factors occur at approximately passenger ear level so that same are emphasized. In addition, vibrations in the air stream, resulting from exhaust air turbulence, beat against the windows and the side of the car at passenger ear level to increase the objectionable din.

An object of the present invention is to provide vent wings eliminating substantially all noises normally resulting from the use of conventional vent wings.

A further object of the invention is to provide vent wings that do not suffer the disadvantage of creating objectionable noise and at the same time provide improved no-draft vehicle ventilation over a wide range of window openings and definitely limit draft ventilation to extreme positions of window opening.

In conducting my investigations, I found that a vacuum area exists around the upper portions of a fast moving vehicle, the area being generally defined by the lower edge of the vehicle windows on either side of the vehicle. Conventional vent wings, when opened to ventilating positions, extend outside of this vacuum area and into the fast moving air stream so that air will impinge directly thereon. Furthermore, the window openings of conventional vent wings are such as to direct exhaust air into the fast moving air stream to create the noise factors noted hereinbefore. Since conventional wings are normally disposed in the fast moving air stream, bugs and road sediment collect thereon obscuring vision. Due to this same factor, conventional vent wings further serve to scoop or direct rain, road sediment and the like into the vehicle interior.

An object of the present invention is to provide vehicle vent wing windows suffering none of the disadvantages of conventional vent wings.

In accomplishing the stated objects of the invention, I provide vent wing windows so designed and pivotally mounted as to have little or no portions thereof extending into the air stream adjacent the vehicle and to have window openings adapted to discharge exhaust air into vacuum areas. Accordingly, the vent wings of the present invention provide the advantages of elimination of objectionable air noise, increased no-draft ventilation over a large range of window openings, lessened danger of obscured vision and intake of clean dry air for ventilation purposes.

Other objects and advantages of the invention will become apparent in the following detailed description of the invention, wherein reference is made to the accompanying drawings, in which.

Figure 1:
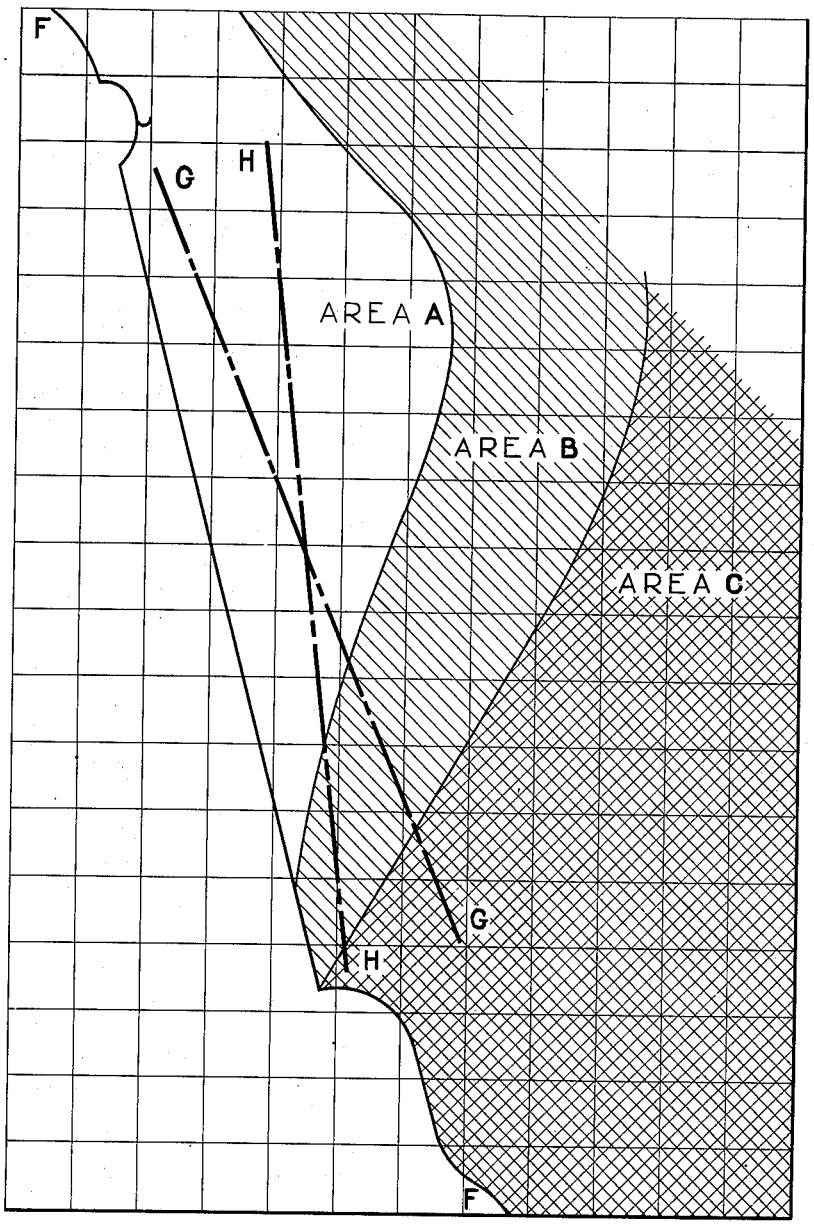
Figure 1 is a chart showing air velocities past the front door of a vehicle and indicating the disposition of the trailing edge of a conventional vent wing and of the trailing edge of the vent wing of the present invention.

As pointed out hereinbefore, preliminary investigations led to the conclusion that objectionable air noises caused by conventional vent wings are the result partially of impingement of fast moving air streams on the wings. To fully investigate the surface pressure conditions adjacent the windows, a grid of fine wires was extended outwardly from a car door to provide a ruled area within which velometer readings could be taken. The results of the investigation are shown in the chart of Figure 1, the chart, for the sake of clarity, merely showing three pressure or wind velocity areas, namely the area A wherein negative to zero pressures exist, the area B wherein wind velocities are within the limits of zero and three thousand feet per minute and the area C wherein the wind velocities are in excess of three thousand feet per minute. The charted areas are representative of pressure conditions at all higher speeds, but are particularly representative of speeds of approximately 50 miles per hour. The no pressure or vacuum area A, as pointed out hereinbefore, extends over the roof of the car. Substantially all passenger cars will have a wind pressure pattern approximating that shown in the chart, wherein the no pressure or vacuum area exists in a triangular shape adjacent the windows and extends up over the roof of the car and the high velocity air stream exists at the belt line of the vehicle. It will be apparent that this is a prevalent condition of contemporary vehicle bodies and front ends where a large percentage of the air below the hood is deflected over the hood causing a high pressure at the bottom of the windshield which, with the V or curved windshields presently utilized on substantially all passenger vehicles, is deflected to the side, augmenting the stream of air passing over the fenders.

The side and a portion of the top of a vehicle are indicated by the solid line F—F in Figure 1. The dash-dot line G—G in the chart indicates the disposition of the trailing edge of conventional vent wing windows when same are moved to ventilating position. As will be noted, the lower portion of the window projects through the pressure area B and into the pressure area C. The window opening for exhaust of air within the vehicle passenger compartment has its greater area disposed within the pressure areas B and C. Therefore, as the vehicle travels forwardly, air within the areas B and C will contact a large area of the window glass and a substantial portion of the air exhausted from the vehicle is exhausted into the areas B and C, with the consequent result of objectionable noise from turbulence, as pointed out hereinbefore.

It will be appreciated from the chart, that optimum, substantially noiseless vent wing windows should have the portion thereof extending exteriorly of the vehicle positioned within the area A. As will be noted, however, the pressure area B extends into contact with the bottom portion of the window immediately above the lower reveal, indicated at S. Therefore, if accepted body design is to be adhered to, a portion of the glass must extend into the pressure area. In accordance with the present invention, the portion of glass of the vent wing window so disposed as to enter within the pressure areas, is limited to extension into the pressure area B and then, to as slight a degree as possible. Such desirable features are accomplished by providing a vent wing having a trailing edge substantially conforming to the dash-dot line H—H of Figure 1. The provision of vent wing windows having a trailing edge as indicated by the line H—H provides for the advantages of very little impingement of a fast moving air stream on the window pane, a small exhaust opening adjacent the lower edge of the window so that exhaust will not occur directly into the fast moving air stream, a large opening at the top of the window so that air exhausting from the vehicle is directed into the vacuum zone adjacent the top of the car and above the roof thereof and positioning of the vent wing substantially within the no pressure area adjacent the vehicle so that bugs and the like carried by the fast moving air stream will not accumulate on the window glass and the vent wing will not act as a scoop to direct foreign articles into the vehicle interior. Also, the vent wing window will provide for draft ventilation only at the full open position of the vent wing and even then, the velocity of the air entering the vehicle passenger compartment will be substantially reduced over that occasioned with conventional vent wings, with only a slight reduction of quantitative air flow.

The problem of providing a vent wing window having a trailing edge positioned as is the line H—H in Figure 1, resolves itself into considerations of the disposition of the pivot axis of the window, the disposition of the trailing edge of the wing and the relative disposition of the pivot axis and the trailing edge of the wing, the object being to maintain as much of the glass exteriorly of the vehicle within the area A as possible. The design features to be discussed hereinafter apply equally to vent wings for rear portions of vehicles and to those for the front doors of vehicles. However, since the problems relating to vent wings disposed in front vehicle doors adjacent the windshield of the vehicle are the most pertinent, the following discussion will be limited thereto.

Figure 2:
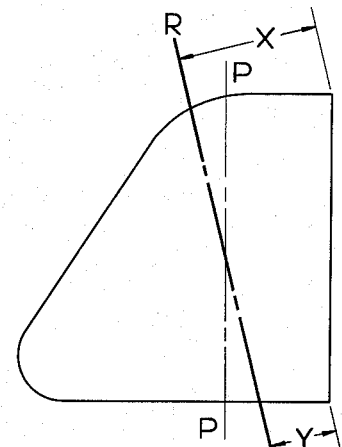
Figure 2 is a side elevation of a standard vent wing window.

Referring now to Figure 2, a conventional vent wing window is shown as having a conventional pivot axis indicated by the light dash-dot line P—P. Looking at Figure 8 momentarily, it will be noted that vehicle windows are inclined slightly to the vertical. Therefore, as the vent wing of Figure 2 is opened or swung about the pivot axis P—P, the lower portion thereof rearwardly of the axis will project more into the air stream than the upper portion thereof, so that the trailing edge of the vent wing will fall approximately on the line G—G of Figure 1 with the resultant objectionable features noted. To obviate these objectionable features, it is desirable to move the trailing edge of the vent wing to the line H—H of Figure 1. This may be accomplished by moving the pivot axis to the position indicated by way of example by the heavy dot-dash line R—R. By so changing the pivot axis of the vent wing, the distance X from the pivot axis R—R to the vent wing trailing edge at the top of the glass will be substantially greater than the corresponding distance when the window is pivoted about the axis P—P so that same extends more into the vacuum or no pressure area A. Conversely, to avoid extension of the lower portion of the glass into the fast moving air stream, the distance Y from the axis R—R to the trailing edge of the wing at the bottom thereof is substantially reduced over the corresponding distance when the wing is pivoted about the axis P—P. Accordingly, the window will project less from the bottom edge and more from the top edge thereof whereby the trailing edge of the wing will conform substantially to the line H—H of Figure 1. Conformance of the trailing edge of the wing to line H—H indicates that the portions of the window exterior of the vehicle will be disposed substantially within the vacuum or zero pressure area A, wherein there will be no impingement of the fast moving air stream upon the surfaces of the window. In addition, the provision of the increased distance X provides for a large exhaust opening at the top of the vent wing through which air from the vehicle may be exhausted into the vacuum area adjacent the top and over the roof of the vehicle. As desideratum, it may be conveniently stated that the distance X should be equal to at least twice the distance Y. As shown in Figure 2, the distance X is twice the distance Y which will lead to the disposition of the trailing edge of the vent wing substantially along the line H—H in Figure 1.

Figure 3:
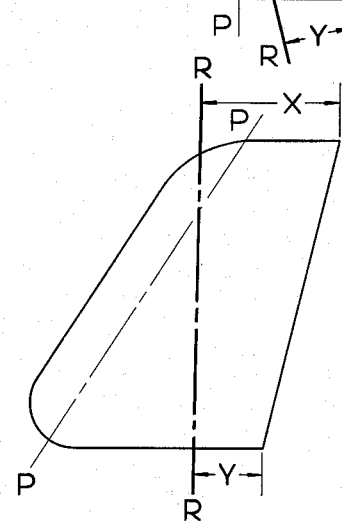
Figure 3 is a side elevation of a modification of the vent wing window shown in Figure 2.

A modification of the vent wing window of Figure 2 is shown in Figure 3, the modified wing having an inclined trailing edge. Conventional design would dictate that the pivotal axis for the wing shown in Figure 3 would lie along the light dash-dot line P—P, but according to the present invention, the pivotal axis for the wing is indicated by the heavy dash-dot line R—R. The disposition of the pivotal axis R—R is such that the relationship X is equal to 2Y is maintained. Accordingly, it will be appreciated that the trailing edge of the window is inclined with respect to the pivotal axis thereof, according to the present invention, so that the pivotal axis and trailing edge converge toward one another as they extend toward the bottom of the vent wing.

Figure 4:
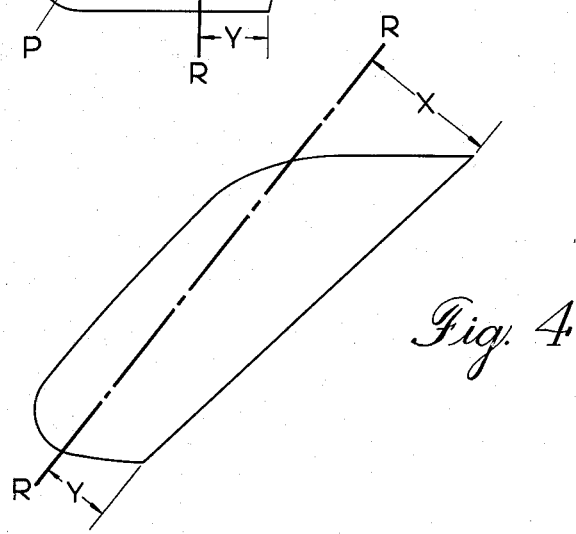
Figure 4 is a side elevation of a vent wing window designed in accordance with the present invention.

Bearing all the foregoing design factors in mind, I have shown in Figure 4 an optimum design for a vent wing formed according to the present invention. The design was made to provide complete ventilating efficiency without objectionable noise and at the same time providing complete esthetic satisfaction when mounted in a vehicle of conventional design. The pivot axis R—R is preferably disposed parallel to the windshield pillar with the trailing edge of the wing inclined with respect to the axis R—R, the axis and trailing edge converging toward one another as they extend downwardly toward the lower portion of the wing. The design provides a large exhaust opening at the top of the window and a very small portion of glass extending into the fast moving air stream at the lower edge of the wing. In terms of exact design, it is preferred that the distance Y be two and one-half inches or less and that the distance X be five inches or more. These particular measurements are especially adapted to contemporary vehicle design wherein the pressure pattern will be substantially as shown in Figure 1. The measurements are approximations, however, and may be varied to meet particular pressure pattern problems in accordance with the design factors set forth hereinbefore.

The vent wing window of Figure 4 is shown in Figures 5 to 8 as installed in a left front vehicle door. The door is indicated generally at 20 and includes a lower reveal portion 22 and a window frame 24. A vertically reciprocal window 26 is mounted in a customary manner within the frame 24. If desired, a division channel 28 may be provided between the vertically movable window 26 and the vent wing 30 or the division channel 28 may constitute a channel frame member for the vertically movable window 26. The vent wing window pane 30 is shaped as indicated in elevation in Figure 4 and is provided with a channel frame member 32 extending along the upper, the forward and the lower edges thereof. The vent wing window may be pivotally mounted in the vehicle door on an axis coinciding with line R—R of Figure 4 in any acceptable manner, such, for example, as that shown in the drawings. As shown, the vent wing is pivotally mounted at its upper edge on a hinge 34 suitably secured to the frame 24. At its lower edge, the vent wing is provided with a pin or pivot post 36 suitably secured to the channel frame 32 of the wing by means of rivets 38 or the like.

A resilient gasket 40 of conventional design is mounted on the window frame about the vent wing to provide a sealing edge forwardly of the pivotal axis of the window facing toward the interior of the vehicle with which the channel frame 32 of the wing 30 is adapted to co-operate to seal the window opening when the window is moved to closed position. The gasket 40 is provided with a similar sealing face rearwardly of the pivotal axis facing toward the exterior of the car and adapted to co-operate with the portions of the channel frame 32 rearwardly of the pivotal axis of the window to seal the window opening to that side of the pivotal axis. The division channel 28 preferably carries a sealing member corresponding to the last defined sealing face of the gasket 40 to seal against the trailing portions of the vent wing. Accordingly, it will be appreciated that the vent wing window 30 is adapted to be swung about its pivotal axis so that the portion thereof forwardly of the axis will extend into the interior of the vehicle and the portion thereof rearwardly of the axis will extend exteriorly of the vehicle. The door 20 includees framing members 42 and 44 beneath the vent wing 30, each provided with an aperture through which the pivot post 36 is adapted to extend. An apertured bracket 46 is suitably secured to the lower surface of the frame member 44 with the aperture therein aligned with the apertures in the frame members 42 and 44 and also adapted for the reception of the pivot post 36. A seal 48 is suitably positioned about the pivot post 36 within the bracket 46 and is adapted to co-operate with the frame member to provide a seal for the pivot post. A brake or friction means is provided to retain the vent wing in any position to which it may be moved, the brake comprising a compression spring 50 suitably confined between the bracket 46 and an adjustable nut 52 threaded to the end of the pivot post 36.

Figure 5:
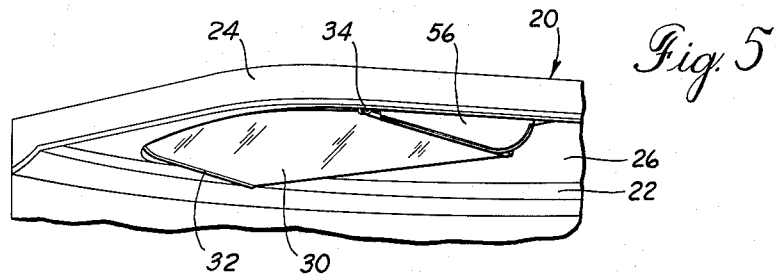
Figure 5 is a top plan view of the vent wing of Figure 4 mounted in the left front door of a vehicle, the vent wing being shown in open ventilating position.
Figure 6:
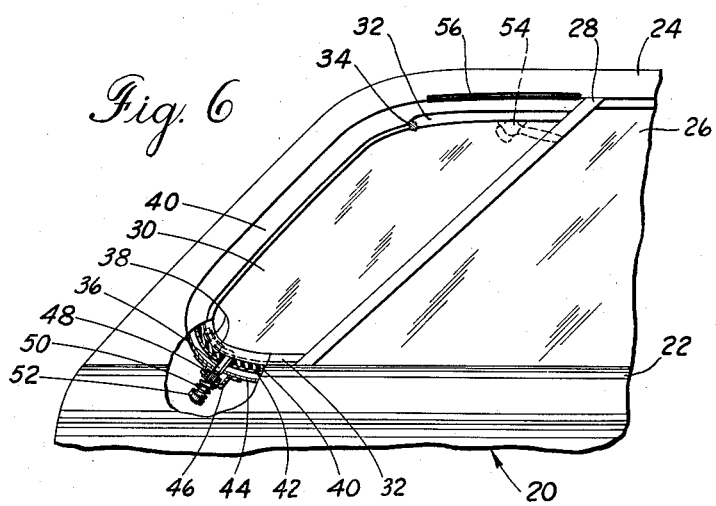
Figure 6 is a side elevation of the vent wing and vehicle door, with portions broken away to show the lower pivot mounting of the vent wing, the vent wing being shown in closed position.
Figure 8:
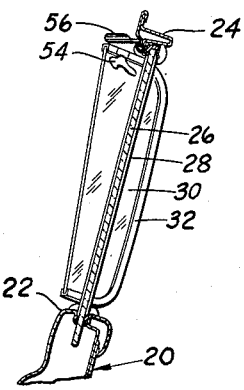
Figure 8 is a cross-sectional view taken substantially on the line 8—8 of Figure 7.
Figure 7:
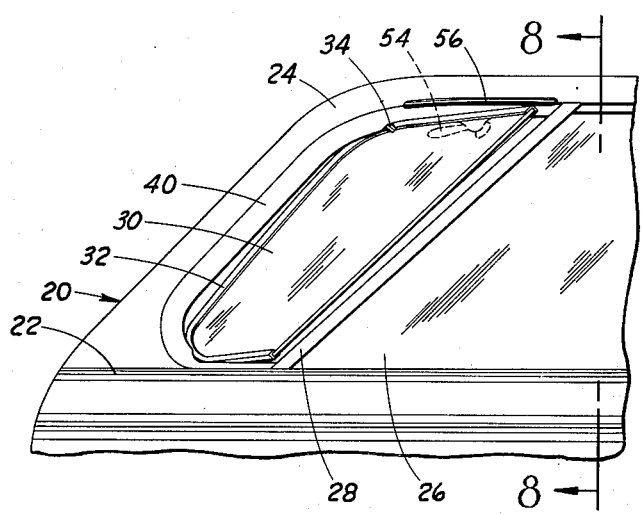
Figure 7 is a side elevation of the vent wing and vehicle door with the vent wing in open position.

From the foregoing, it will be appreciated that the vent wing window 30 is mounted for pivotal movement upon an axis coinciding with the line R—R of Figure 4 and is adapted to be swung about that axis to any one of a plurality of open positions. In the preferred embodiment, the distance from the pivotal axis to the trailing edge at the bottom of the glass is approximately two to two and one-half inches and the distance from the pivotal axis to the trailing edge at the top of the glass is approximately five to six inches. As shown in Figures 5, 7 and 8, the vent wing 30 is adapted to be opened to any one of a plurality of ventilating positions wherein the wing extends rearwardly and outwardly with respect to the door of the vehicle. In these positions, air within the vehicle will be exhausted through the opening rearwardly of the pivotal axis of the window, which opening has its greater portion disposed within the vacuum or no pressure area adjacent the vehicle to exhaust substantially all of the air into that area. Furthermore, the window is inclined to direct air exhausted from the vehicle upward into the no pressure area. Accordingly, little, if any, air will be exhausted into the fast moving air stream adjacent the reveal portion 22 of the door 20. As a result, the turbulence of the air exhausted from the vehicle will not be noticed by the occupants of the vehicle since same will be either substantially non-existent or occurring at such distance from the passengers' ears that same will not be noticeable. Likewise, no turbulence will be set up within the fast moving air stream to beat against the windows and disturb the passengers within the vehicle. As will be noted from Figure 8, the trailing edge of the vent wing window will conform substantially to the line H—H shown in Figure 1 so that very little, if any, of the window will be disposed within the fast moving air stream.

As the vent wing is opened beyond the ventilating position shown in Figure 8, the amount of ventilation will be increased and a noticeably greater movement of air within the vehicle passenger compartment will occur until the vent wing is moved to an extreme open position wherein same is inclined at substantially 90 degrees to the open position shown in Figures 5, 7 and 8. In such position, the trailing edge of the vent wing may possibly extend into the fringe portions of the fast moving air stream passing around the vehicle so as to direct portions of that air into the vehicle to provide draft ventilation. Normally, however, the vent wing will not project into the air stream and accordingly any noise occasioned by impingement of the fast moving air stream against the window will be obviated. However, draft ventilation will be provided due to the fact that the exhaust opening of the window is of substantial size and the rush of incoming air will be directed toward the passengers in the vehicle so that they will sense a direct draft but will not actually be subjected to the extremely high pressure or velocity draft occasioned upon direction of the fast moving air stream into the interior of the vehicle as is effected by conventional vent wings. Accordingly, it will be appreciated that the present invention provides a vent wing window capable of effecting no-draft ventilation throughout substantially all its open positions, with the exception of its extreme open position wherein the ventilation will be of such substantial proportions that the movement of air within the vehicle passenger compartment will be sensed as a draft by the occupants thereof. It will be further appreciated that in all open positions of the vent wing window of the present invention, any noise will be substantially, if not completely, obviated, thus contributing greatly to the increased comfort and ease of the occupants of the vehicle.

The vent wing window may be actuated in any desired manner, such, for example, as by conventional crank means well known in the art. However, a more economical and convenient manner of actuating the wing is provided by mounting a latch 54 on the vent wing window frame 32 to provide means by which the vent wing may be moved to its various positions and by means of which the vent wing may be locked. The latch 54 is disposed at the top edge of the wing adjacent the trailing edge of the wing to provide a substantial lever with respect to the pivotal axis of the wing so that same may be easily swung to any desired position against the resistance of the brake means 50 and 52. While such latches have normally been disposed at the lower edge of the window, the present invention includes as a preferred feature thereof the mounting of the latch at the upper edge of the window to provide sufficient leverage for the easy manipulation of the window and to provide a lock at the portion of the window having the greatest spacing from the pivotal axis. Such provision renders the vent wing window tamper-proof since the lower edge of the wing will be substantially rigid due to the short extent thereof. Since the present invention provides a substantial exhaust opening at the upper edge of the vent wing, it is desirable to provide a rain shield 56 to prevent entry of water through the exhaust opening when the window is open in inclement weather and the vehicle is stopped or moving slowly.

From the foregoing, it will be appreciated that the present invention provides a vent wing window having the features of increased no-draft ventilation throughout substantially all open positions of the window and having direct draft ventilation in an extreme open position of the window, which direct draft does not constitute the subjection of vehicle passengers to the direct blast of fast moving air passing over the external surfaces of the vehicle. The present invention further provides the elimination of objectionable air noise caused by conventional vent wings and also eliminates the objectional feature of conventional wings of scooping foreign materials into the interior of the vehicle.

While I have described in detail what I regard to be a preferred embodiment of my invention, it will be apparent that the design factors set forth in the foregoing may be applied to various types of vent wing windows and, accordingly, the described preferred embodiment of the invention does not constitute a limitation upon the invention, except as defined by the appended claims.

I claim:

1. A vent wing window for vehicles comprising a window pane adapted to be pivotally supported on a vehicle, the pivotal axis and the trailing edge of said pane being inclined with respect to one another and converging toward the lower edge of said pane, the distance from the pivotal axis of said pane to the trailing edge thereof at the bottom of said pane being less than two and one-half inches.

2. A vent wing window for vehicles comprising a window pane adapted to be pivotally mounted on a vehicle, the trailing edge of said window pane being so disposed with respect to the pivotal axis of said pane that the distance from the pivotal axis of the trailing edge at the top of said pane is approximately five inches and the distance from the pivotal axis to the trailing at the bottom of said pane is approximately two inches.

3. A vent wing window for vehicles comprising a window pane adapted to be pivotally mounted on a vehicle, the trailing edge of said window pane being so disposed with respect to the pivotal axis of said pane that the distance from the pivotal axis to the trailing edge at the top of said pane is in excess of five inches and the distance from the pivotal axis to the trailing edge at the bottom of said pane is less than two and one-half inches.

4. In a vehicle wherein, upon movement of the vehicle through air, air pressure areas of varying magnitude are established adjacent the sides of the vehicle, the air pressure areas including a vacuum and zero pressure area immediately adjacent the side window portions of the vehicle and extending from adjacent the lower edge of the side windows upwardly and outwardly and defining a generally triangular area, an area of relatively slow moving air immediately outwardly of the vacuum and zero pressure area and an area of fast moving air outwardly of the area of slow moving air; a vent wing window comprising a window pane adapted to be pivotally mounted on the vehicle at the side thereof for movement of the portions of said pane rearwardly of its pivotal axis to the exterior of the vehicle, the pivotal axis and the trailing edge of said pane being inclined with respect to one another and converging toward the lower edge of said pane, the distance between the trailing edge and the pivotal axis of said pane at the top and bottom thereof being substantially equal to the corresponding dimensions from the pivotal axis of said pane to the margin of said vacuum and zero pressure area, whereby said pane, in all open positions thereof, is positioned substantially within the said vacuum and zero pressure area.

5. In a vehicle wherein, upon movement of the vehicle through air, air pressure areas of varying magnitude are established adjacent the sides of the vehicle, the air pressure areas including a vacuum and zero pressure area immediately adjacent the side window portions of the vehicle and extending from adjacent the lower edge of the side windows upwardly and outwardly and defining a generally triangular area, an area of relatively slow moving air immediately outwardly of the vacuum and zero pressure area and an area of fast moving air outwardly of the area of slow moving air; a vent wing window comprising a window pane, and means for pivotally supporting said pane on the vehicle at the side thereof for movement of the portions of said pane rearwardly of its pivotal axis to the exterior of the vehicle, the trailing edge of said pane being inclined with respect to the pivotal axis thereof in a direction extending away from the pivotal axis from the bottom to the top of said pane, the distance between the pivotal axis and the trailing edge of said pane at the upper edge thereof being relatively great and substantially equal to the corresponding distance between the pivotal axis of said pane and the margin of said vacuum and zero pressure area whereby the upper portions of said pane in all open positions thereof extend a substantial distance into the said vacuum and zero pressure area, the distance between the pivotal axis and trailing edge of said pane at the lower edge thereof being relatively small and slightly greater than the corresponding distance between the pivotal axis of said pane and the margin of said vacuum and zero pressure area whereby the lower portions of said pane in all open positions thereof extend a limited distance into the said area of relatively slow moving air.

6. In a vehicle wherein, upon movement of the vehicle through air, air pressure areas of varying magnitude are established adjacent the sides of the vehicle, the air pressure areas including a vacuum and zero pressure area immediately adjacent the side window portions of the vehicle and extending from adjacent the lower edge of the side windows upwardly and outwardly and defining a generally triangular area, an area of relatively slow moving air immediately outwardly of the vacuum and zero pressure area and an area of fast moving air outwardly of the area of slow moving air; a vent wing window comprising a window pivotally mounted on the vehicle so that the same may be swung to move the rearward portions thereof exteriorly of the vehicle, said window being shaped and mounted to dispose the trailing edge thereof in all open positions thereof in a line extending from a point adjacent the vehicle upwardly and outwardly and generally approximating the outer margin of the said vacuum and zero pressure area, whereby said window is disposed substantially within that area in all open positions thereof.

7. For use in the door of a vehicle, the door having a generally horizontal reveal and a leading window frame portion inclined with respect to the reveal, the vehicle upon movement through air establishing with respect to itself a vacuum and zero pressure area extending from adjacent the reveal upwardly and outwardly and defining a generally triangular area and an area of moving air outside the vacuum and zero pressure area; a vent wing window comprising a window pane adapted to be pivotally supported on the door on an axis inclined with respect to the reveal in the general direction of the inclination of the leading frame portion of the door, said window pane having a trailing edge inclined with respect to its pivotal axis and forming a lesser angle of inclination with respect to the reveal than does the pivotal axis, the distance between the pivotal axis and the trailing edge of said pane at the upper edge thereof being substantially equal to the corresponding distance between the pivotal axis of said pane and the margin of said vacuum and zero pressure area whereby the upper portions of said pane in all open positions thereof extend a substantial distance into the said vacuum and zero pressure area, the distance between the pivotal axis and the trailing edge of said pane at the lower edge thereof being slightly greater than the corresponding distance between the pivotal axis of said pane and the margin of said vacuum and zero pressure area whereby the lower portions of said pane in all open positions thereof extend a limited distance into the said area of moving air, the distance between the pivotal axis and trailing edge of said pane at the upper edge thereof being approximately twice the distance between the pivotal axis and trailing edge of said pane at the lower edge thereof.

8. For use in a door of a vehicle, the door having a generally horizontal reveal and a leading window frame portion inclined with respect to the reveal, the vehicle upon movement through air establishing with respect to itself a vacuum and zero pressure area extending from adjacent the reveal upwardly and outwardly in a generally triangular pattern and an area of moving air outside of the vacuum and zero pressure area; a vent wing window comprising a window pane adapted to be pivotally supported on the door on an axis inclined with respect to the leading window frame portion of the door, the leading window frame portion of the door and the pivotal axis of said pane converging toward the upper edge of said pane, said window pane having a trailing edge inclined with respect to the pivotal axis of said pane, the trailing edge and the pivotal axis converging toward the lower edge of said pane, the distance between the trailing edge and the pivotal axis of said pane at the top and bottom thereof each being approximately equal to the corresponding distances between the pivotal axis of said pane and the margin of said vacuum and zero pressure area, the said distance at the top of said pane being at least twice the said distance at the bottom of said pane, whereby said pane in all open positions of the same is positioned substantially within the said vacuum and zero pressure area.

9. For use in the door of a vehicle, the vehicle upon movement through air establishing with respect to itself a vacuum and zero pressure area extending from adjacent the door reveal outwardly of the door and up over the top of the vehicle in a generally triangular pattern, an area of relatively slow moving air immediatly outwardly of the vacuum and zero pressure area and an area of fast moving air outwardly of the area of slow moving air; a vent wing window comprising a window pane pivotally supported adjacent one side of the door, said pane being adapted to be moved about its pivotal axis to swing the rearward portion of said pane outwardly of the door, said pane having a trailing edge inclined in downwardly converging relation with respect to its pivotal axis at such inclination that the trailing edge of said pane in all open positions thereof extends from a position adjacent the door at the lower edge of said pane upwardly and outwardly of the door to a point at the upper edge of said pane spaced a substantial distance outwardly of the door, the distance between the pivotal axis and the trailing edge of said pane at the upper edge thereof being substantially equal to the corresponding distance between the pivotal axis of said pane and the margin of said vacuum and zero pressure area whereby the upper portions of said pane in all open positions thereof extend a substantial distance into the said vacuum and zero pressure area, the distance between the pivotal axis and trailing edge of said pane at the lower edge thereof being slightly greater than the corresponding distance between the pivotal axis of said pane and the margin of said vacuum and zero pressure area whereby the lower portions of said pane in all open positions thereof extend a limited distance into the said area of relatively slow moving air, said pane when open and when the vehicle is moving inducing the flow of air into the vehicle at the forward side thereof and the exhaust of air from the interior of the vehicle at the rearward side thereof, said pane when open providing at the rearward side thereof a large exhaust opening adjacent the top of the vehicle, whereby air from the interior of the vehicle is exhausted into the vacuum and zero pressure area adjacent the top of the vehicle.

10. In a vehicle having a windshield and side windows, the vehicle upon movement through air establishing with respect to itself a vacuum and zero pressure area extending from adjacent the lower edge of the side windows outwardly of the vehicle and up over the roof of the vehicle in a generally triangular pattern and an area of fast moving air outside of the vacuum and zero pressure area; a vent wing window comprising a side window for the vehicle adapted to be pivotally mounted on the vehicle in such manner that the rearward portions thereof may be swung exteriorly of the side of the vehicle, said vent wing having a trailing edge disposed with respect to the pivotal axis thereof to extend, in all open positions thereof, the lower portions thereof a limited degree into the area of fast moving air and the upper portions thereof a substantial distance outwardly from the vehicle into the vacuum and zero pressure area surrounding the upper portions of the vehicle, the distance between the pivotal axis and trailing edge of said vent wing at the upper edge thereof being approximately twice as great as the distance between the pivotal axis and trailing edge of said vent wing at the lower edge thereof.

11. In a vehicle having a windshield and side windows, the vehicle upon movement through air establishing with respect to itself a vacuum and zero pressure area extending from adjacent the lower edge of the side windows outwardly of the vehicle and up over the roof of the vehicle in a generally triangular pattern and an area of fast moving air outside of the vacuum and zero pressure area; a vent wing comprising a side window pane adapted to be movably mounted on the vehicle so that portions thereof may be moved exteriorly of the vehicle, the portions of said pane adapted to be moved exteriorly of the vehicle approximating generally the outer margin of the triangular pattern of said vacuum and zero pressure area whereby said pane in substantially all open positions thereof will be positioned substantially within the vacuum and zero pressure area adjacent the vehicle when the vehicle is moving, the upper portions of said pane having an extension exteriorly of the vehicle approximately twice as great as the extension of the lower portions thereof.

12. In a vehicle having a windshield and side windows, the vehicle upon movement through air establishing with respect to itself a vacuum and zero pressure area extending from adjacent the lower edge of the side windows outwardly of the vehicle and up over the roof of the vehicle in a generally triangular pattern and an area of fast moving air outside of the vacuum and zero pressure area; a vent wing window comprising a side window pane adapted to be movably mounted on the vehicle so that portions thereof may be moved exteriorly of the vehicle, the portions of said pane adapted to be moved exteriorly of the vehicle being generally triangular and conforming generally with the triangular pattern of said vacuum and zero pressure area but extending slightly into said area of moving air at the lower portions thereof, whereby said pane in substantially all open positions thereof will be positioned substantially within the vacuum and zero pressure area adjacent the vehicle when the vehicle is moving, the upper portions of said pane having an extension exteriorly of the vehicle at least twice as great as the extension of the lower portions thereof, said pane when open and when the vehicle is moving inducing the flow of air into the vehicle and the exhaust of air from the vehicle, the exhaust opening of said pane being disposed to exhaust air from the vehicle adjacent the roof thereof into the vacuum and zero pressure area in all open positions of said pane.

13. In a vehicle wherein, upon movement of the vehicle through air, air pressure areas of varying magnitude are established adjacent the sides of the vehicle, the air pressure areas including a vacuum and zero pressure area immediately adjacent the side window portions of the vehicle and extending from adjacent the lower edge of the side windows upwardly and outwardly and defining a generally triangular area, and an area of moving air outwardly of the vacuum and zero pressure area; a vent wing window comprising a window pane adapted to be pivotally supported on the vehicle, said pane having a trailing edge inclined with respect to the pivotal axis of said pane in downwardly converging relationship, the distance between the trailing edge and the pivotal axis of said pane at the top and bottom thereof each being approximately equal to the corresponding distances between the pivotal axis of said pane and the margin of said vacuum and zero pressure area, the portions of said pane between said pivotal axis and said trailing edge thereof being generally triangular and conforming generally to the triangular pattern of said vacuum and zero pressure area and being pivotal to the exterior of the vehicle to be positioned in all open positions of said pane substantially within the said vacuum and zero pressure area, the distance between the pivotal axis and trailing edge of said pane at the top thereof being at least twice as great as the distance between the pivotal axis and the trailing edge of said pane at the bottom thereof, and a latch secured to the upper edge of said pane adjacent the trailing edge thereof for moving said pane and for locking the same in closed position.

References Cited in the file of this patent

UNITED STATES PATENTS

| | | |
|---|---|---|
| 2,087,821 | Simpson | July 20, 1937 |
| 2,145,668 | Taylor | Jan. 31, 1939 |
| 2,164,341 | Morrison | July 4, 1939 |
| 2,295,277 | Wilshusen | Sept. 8, 1942 |